(12) United States Patent
Lee

(10) Patent No.: US 9,457,626 B2
(45) Date of Patent: Oct. 4, 2016

(54) TIRE SEPARATION WARNING SYSTEM AND METHOD

(71) Applicant: Hyundai Motor Company, Seoul (KR)

(72) Inventor: Jong Ho Lee, Incheon (KR)

(73) Assignee: Hyundai Motor Company, Seoul (KR)

(*) Notice: Subject to any disclaimer, the term of this patent is extended or adjusted under 35 U.S.C. 154(b) by 278 days.

(21) Appl. No.: 14/098,072

(22) Filed: Dec. 5, 2013

(65) Prior Publication Data

US 2014/0167949 A1   Jun. 19, 2014

(30) Foreign Application Priority Data

Dec. 14, 2012   (KR) .................. 10-2012-0146800

(51) Int. Cl.
*B60C 23/00* (2006.01)
*G01M 17/00* (2006.01)
*B60C 23/04* (2006.01)

(52) U.S. Cl.
CPC .................. *B60C 23/0433* (2013.01)

(58) Field of Classification Search
CPC ...................................................... B60C 23/06
USPC ....................................................... 340/443
See application file for complete search history.

(56) References Cited

U.S. PATENT DOCUMENTS

| 2002/0095253 A1* | 7/2002 | Losey | B60C 23/0408 701/71 |
| 2006/0265154 A1* | 11/2006 | Potts | G01M 17/02 702/56 |
| 2007/0164853 A1* | 7/2007 | Matsuda | B60T 8/1725 340/438 |

FOREIGN PATENT DOCUMENTS

| JP | 2005-193712 A | 7/2005 |
| JP | 2005-329907 A | 12/2005 |
| JP | 2006-003281 A | 1/2006 |
| KR | 20-0150097 | 7/1999 |
| KR | 10-2007-0019142 A | 2/2007 |
| KR | 10-2009-0034519 A | 4/2009 |

* cited by examiner

*Primary Examiner* — Jennifer Mehmood
*Assistant Examiner* — John Mortell
(74) *Attorney, Agent, or Firm* — Mintz Levin Cohn Ferris Glovsky and Popeo, P.C.; Peter F. Corless

(57) ABSTRACT

A tire separation warning system and method that includes a sensor that senses pressure of a tire and a receiver that calculates the amount of change in tire radius from the pressure of the tire received from the sensor. In addition, the receive estimates tire separation risk. A display warns a driver of the tire separation risk, when the tire separation risk is transmitted from the receiver.

17 Claims, 4 Drawing Sheets

| | |
|---|---|
| P | Pressure of tire |
| $R_t$ | Radius of tire |
| $R_w$ | Radius of wheel |
| $\theta$ | Deformation angle |
| $\delta$ | Amount of change in radius of tire |
| T | Thickness of tire |

TIRE SEPARATION WARNING SYSTEM AND METHOD

CROSS-REFERENCE TO RELATED APPLICATION

This application claims priority to and the benefit of Korean Patent Application No. 10-2012-0146800 filed in the Korean Intellectual Property Office on Dec. 14, 2012, the entire contents of which are incorporated herein by reference.

BACKGROUND (a) Field of the Invention

The present invention relates to a tire separation warning system and method, particularly, a warning system that warns of tire separation, using a sensor that senses the air pressure in tires.

(b) Description of the Related Art

Tire separation occurs during vehicle travel due to incorrect mounting or low air pressure (e.g., air pressure below a predetermined threshold) in many cases rather than a defect in the tires themselves. The low air pressure can be checked by the external appearance of the tires or a TPMS (Tire Pressure Monitoring System). However, when the tires are mounted incorrectly, for example, when bolts loosen or there is a problem with the bolts, the driver may not easily recognize low air pressure and unexpected problems may generate during driving of the vehicle.

The above information disclosed in this section is only for enhancement of understanding of the background of the invention and therefore it may contain information that does not form the prior art that is already known in this country to a person of ordinary skill in the art.

SUMMARY

The present invention provides a tire separation warning system and method having advantages of warning of a defect or separation of tires by calculating the amount of change in radius of the tires, using a tire pressure monitoring system.

An exemplary embodiment of the present invention provides a tire separation warning system including: a sensor that senses pressure of a tire; a receiver that calculates the amount of change in radius of a tire from the pressure of the tire received from the sensor and estimates risk of separation of the tire; and a display that warns a driver of the tire separation risk, when the tire separation risk is transmitted from the receiver.

The sensor may be a tire pressure monitoring system and may be attached to each of the tires. The tire separation warning system may further include a sensor controller that turns the sensors on and off under the control of the receiver. The sensors and the receivers may communicate sensing information with each other via a wireless communication network. The receiver may calculate the volume of the tires from the pressure of the tires based on stored logic and may calculate the amount of radius change of the tires by calculating deformation angles of the tires from the volumes of the tires. The display may be disposed on an instrument panel or a room mirror.

The volumes of the tires may satisfy the following Equation, $$\therefore V_t = \pi T R_t^2 \left( 1 - \left(\frac{R_w}{R_t}\right)^2 - \frac{1}{2}(\theta - \sin\theta) \right) \quad \text{[Equation]}$$

where, $V_t$ is the volume of a tire, $R_t$ is the radius of a tire, $R_w$ is the radius of a wheel, $\theta$ is the deformation angle of a tire, and $T$ is the thickness of a tire.

The amount of radius change of the tires may be calculated by the following Equation, $$\delta = R_t \left( 1 - \cos\frac{1}{2}\theta \right) \quad \text{[Equation]}$$

where $\delta$ is the amount of change in radius of a tire.

According to an exemplary embodiment, it may be possible to apply the system, using existing tire pressure monitoring systems, without an additional cost increase. Further, it may be possible to increase driver safety by warning the drive of a defect or risk of tire separation by adding logic without an additional machine. It may be possible to achieve a more accurate technology by applying the present invention as it is when using an intelligent tire system later.

DETAILED DESCRIPTION

Figure 1:
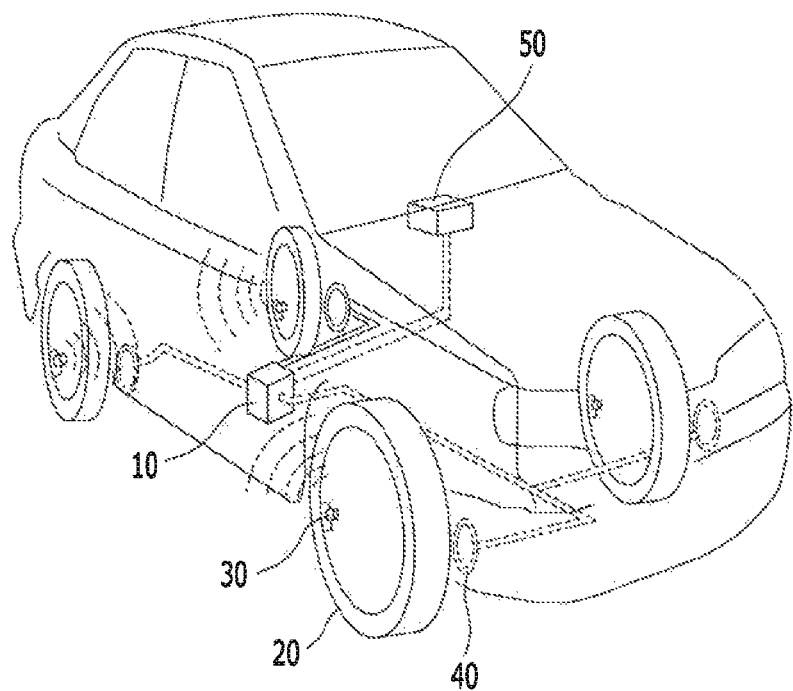
FIG. 1 is an exemplary diagram schematically showing a tire separation warning system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising," will be understood to imply the inclusion of stated elements but not the exclusion of any other elements.

FIG. 1 is an exemplary diagram schematically showing a tire separation warning system according to an exemplary embodiment of the present invention. As shown in FIG. 1, a tire separation warning system according to an exemplary embodiment of the present invention may include a receiver 10, a sensor 30 attached on a tire 20, a sensor controller 40, and a display 50.

The sensor 30 may be attached to each of the four tires 20, as in FIG. 1, and may be configured to sense the temperature and pressure of the tire 20. The sensor 30 may include a TPMS (Tire Pressure Monitoring System). Sensing information may be transmitted to the receiver 10 via wireless communication. The sensor controller 40 may be configured to operate the sensor 30, using low-frequency control. In other words, the sensor controller 40 may be configured to separately operate or turn off the sensor 30.

The receiver 10, operated by a controller, may be configured to receive sensing information via wireless communication from the sensors 30 and the tire separation warning system may be configured to operate based on stored logic. Further, the receiver 10 may be configured to separately operate the sensors 30 by operating the sensor controller 40.

The display 50 may be disposed on the instrument panel or a mirror within the vehicle, and may be configured to receive a tire separation warning as an image from the receiver and display the warning to the driver.

Figure 2:
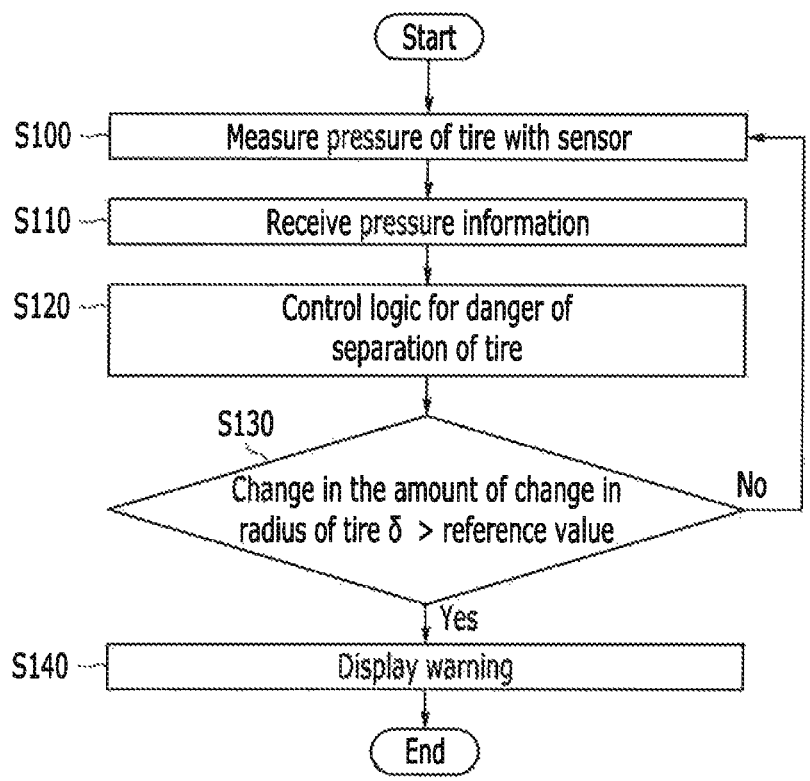
FIG. 2 is an exemplary flowchart illustrating the operation of a tire separation warning system according to an exemplary embodiment of the present invention.
Figure 3:
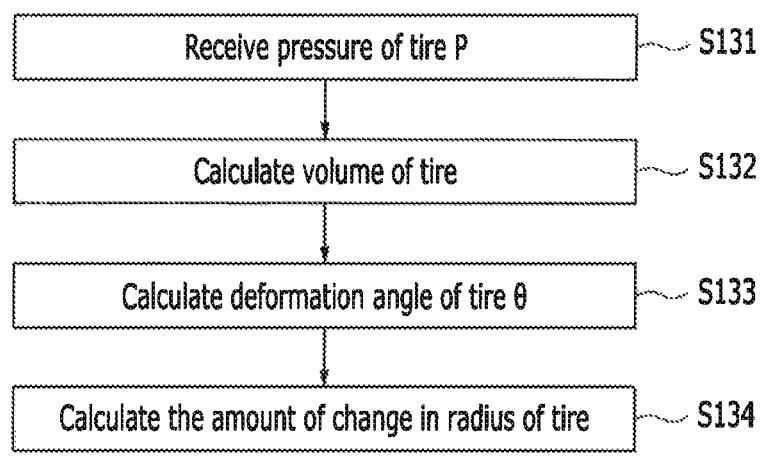
FIG. 3 is an exemplary flowchart illustrating calculation of the amount of change in radius of a tire according to an exemplary embodiment of the present invention.
Figure 4:
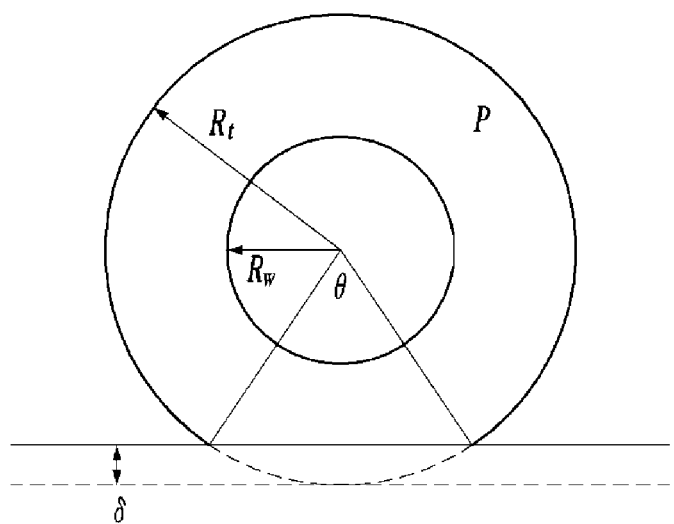
FIG. 4 is an exemplary conceptual diagram for the calculation in FIG. 3 according to an exemplary embodiment of the present invention.

A process of warning of tire separation which is executed by the logic stored in the receiver 10 is described hereinafter with reference to FIGS. 2 to 4.

First, the receiver 10 may be configured to periodically receive sensing information from the sensors 40 by operating the sensor controller 40 (S100). The sensors 30 may be configured to measure the pressure of the tires 20 and transmit pressure information from the sensing information to the receiver 10 via wireless communication. When receiving the pressure information via wireless communication (S110), the receiver 10 may be configured to perform calculation logic for whether the tires are separated, by executing the stored logic (S120). In other words, the receiver 10 may be configured to calculate whether a change in the tire radius change is equal to or greater than a reference value (S130). In particular, the receiver 10 may be configured to store the information on the tires 20, as in FIG. 4.

When pressure information of the tires 20 is received (S131), the receiver 10 may be configured to calculate the volumes of the tires 20 from the pressure information (S132). The volumes of the tires may be expressed as the following equations, $$\Delta P = -\beta \Delta V \quad \text{[Equation 1]}$$

$$\therefore V_t = \pi T R_t^2 \left(1 - \left(\frac{R_w}{R_t}\right)^2 - \frac{1}{2}(\theta - \sin\theta)\right) \quad \text{[Equation 2]}$$

where $\beta$ is the rate of change in volume of air, P is pressure of a tire, $V_t$ is the volume of a tire, $R_t$ is the radius of a tire, $R_w$ is the radius of a wheel, $\theta$ is the deformation angle of a tire, and T is the thickness of a tire.

When the amount of change in tire volume is calculated by Equation 1 and the current tire volumes are calculated, the deformation angles of the tires $\theta$ are calculated from the current tire volumes (S133). When the deformation angles of the tires $\theta$ are calculated, the amount of change in radius of the tires $\delta$ may be calculated by Equation 3 (S134).

$$\delta = R_t \left(1 - \cos\frac{1}{2}\theta\right) \quad \text{[Equation 3]}$$

The receiver 10 may be configured to calculate the amount of change in radius of the tires $\delta$, using the stored logic, and whether the change in tire radius change $\delta$ is greater than a reference value may be determined.

When the change in tire radius change $\delta$ is greater than the reference value, a separation risk of the tires 20 may be determined, since when the tires 20 shake transversely, that is, left and right, the ground contact areas and the pressures may rapidly change and the tire radius change $\delta$ may not be constant and rapidly changed. Accordingly, the receiver 10 may be configured to warn the driver of the tire separation risk via the display 50 (S140). The driver receiving the warning from the display 50 may stop the vehicle and replace the tires 20.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| Receiver 10 | Tire 20 |
| Sensor 30 | Sensor controller 40 |
| Display 50 | |

What is claimed is:

1. A tire separation warning system comprising:
 a sensor configured to sense pressure of a tire; and
 a receiver configured to calculate the tire radius change from the pressure of the tire received from the sensor, determine whether a change in tire radius is greater than a reference value, and transmit a tire separation risk to a display when the change in tire radius is greater than the reference value,
 wherein the display is configured to display a tire separation risk warning, when the tire separation risk is transmitted from the receiver.

2. The system of claim 1, wherein the sensor is a tire pressure monitoring system.

3. The system of claim 1, wherein the sensor is attached to each vehicle tire.

4. The system of claim 1, further comprising:
 a sensor controller operated by the receiver and configured to turn the sensors on and off.

5. The system of claim 1, wherein the sensors and the receivers communicate sensing information with each other via a wireless communication network.

6. The system of claim 1, wherein the receiver is further configured to calculate volume of the tires from the pressure of the tires based on a stored logic and calculate the amount of change in tire radius by calculating deformation angles of the tires from the volume of the tires.

7. The system of claim 6, wherein the volume of the tires is calculated by:

$$\therefore V_t = \pi T R_t^2 \left(1 - \left(\frac{R_w}{R_t}\right)^2 - \frac{1}{2}(\theta - \sin\theta)\right)$$

where, Vt is the volume of a tire, Rt is the radius of a tire, Rw is the radius of a wheel, $\theta$ is the deformation angle of a tire, and T is the thickness of a tire.

8. The system of claim 7, wherein the amount of change in tire radius is calculated by :

$$\delta = R_t \left(1 - \cos\frac{1}{2}\theta\right)$$

where $\delta$ is the amount of change in radius of a tire.

9. The system of claim 1, wherein the display is disposed on an instrument panel or a vehicle mirror.

10. A tire separation warning method, comprising:
 receiving, at a controller, pressure of tires from a plurality of sensors via wireless communication;
 calculating, by the controller, whether a change in tire radius is greater than a reference value; and
 in response to determining, a tire separation risk, displaying, by the controller, a tire separation risk warning onto a display.

11. The method of claim 10, wherein the sensors are a tire pressure monitoring system.

12. The method of claim 10, wherein the sensors are attached to each vehicle tire.

13. The method of claim 10, wherein the controller is further configured to turn the plurality of sensors on and off.

14. The method of claim 10, further comprising:
 calculating, by the controller, volume of the tires from the pressure of the tires based on a stored logic; and
 calculating, by the controller, the amount of change in tire radius by calculating deformation angles of the tires from the volume of the tires.

15. The method of claim 14, wherein the volume of the tires is calculated by:

$$\therefore V_t = \pi T R_t^2 \left(1 - \left(\frac{R_w}{R_t}\right)^2 - \frac{1}{2}(\theta - \sin\theta)\right)$$

where, Vt is the volume of a tire, Rt is the radius of a tire, Rw is the radius of a wheel, $\theta$ is the deformation angle of a tire, and T is the thickness of a tire.

16. The method of claim 15, wherein the amount of change in tire radius is calculated by:

$$\delta = R_t \left(1 - \cos\frac{1}{2}\theta\right)$$

where $\delta$ is the amount of change in radius of a tire.

17. The method of claim 10, wherein the display is disposed on an instrument panel or a vehicle mirror.

* * * * *